(12) United States Patent
Readman

(10) Patent No.: US 10,788,149 B2
(45) Date of Patent: Sep. 29, 2020

(54) FLUID COUPLING

(71) Applicant: SELF ENERGISING COUPLING COMPANY LIMITED, Wincham, Northwich Cheshire (GB)

(72) Inventor: Matt Readman, Wincham (GB)

(73) Assignee: Self Energising Coupling Company Limited, North Cheshire (GB)

(*) Notice: Subject to any disclaimer, the term of this patent is extended or adjusted under 35 U.S.C. 154(b) by 302 days.

(21) Appl. No.: 15/778,851

(22) PCT Filed: Nov. 24, 2016

(86) PCT No.: PCT/GB2016/053690
§ 371 (c)(1),
(2) Date: May 24, 2018

(87) PCT Pub. No.: WO2017/089807
PCT Pub. Date: Jun. 1, 2017

(65) Prior Publication Data
US 2018/0347733 A1  Dec. 6, 2018

(30) Foreign Application Priority Data
Nov. 24, 2015  (GB) .................................. 1520763.2

(51) Int. Cl.
*F16L 21/02* (2006.01)
*F16J 15/56* (2006.01)
(Continued)

(52) U.S. Cl.
CPC ............. *F16L 21/02* (2013.01); *F16J 15/164* (2013.01); *F16J 15/56* (2013.01); *F16L 21/025* (2013.01)

(58) Field of Classification Search
CPC . F16L 2201/20; Y10S 285/924; F16K 15/142
(Continued)

(56) References Cited

U.S. PATENT DOCUMENTS 2,727,761 A * 12/1955 Elliott .................... F16L 37/46
285/83
2,823,699 A * 2/1958 Willis .................. F16L 41/008
137/625.26
(Continued)

FOREIGN PATENT DOCUMENTS

DE  200 07 478 U1  10/2001
JP  H10281367 A   10/1998

OTHER PUBLICATIONS

Great Britain Combined Search and Examination Report for GB1520763.2 dated May 24, 2016.
(Continued)

*Primary Examiner* — Aaron M Dunwoody
(74) *Attorney, Agent, or Firm* — Shumaker, Loop & Kendrick, LLP

(57) ABSTRACT

A fluid coupling has a first part (100) sealed to a sealing surface of a second part (200), wherein the first part carries a sealing part (300) and the second part includes a gap (G) in the sealing surface, across which the sealing part is arranged to transition. A vent (210) is provided between the sealing surface and the gap. An aperture to the vent on the sealing surface is relatively small so that fluid pressure does not act to deform the seal as it crosses said aperture. Said aperture is spaced off-set from the gap on the sealing surface. The off-set provides a portion of sealing surface adjacent the gap and between the gap and aperture against which the seal can contact. The vent acts to allow fluid (400) to enter the gap before the seal starts to cross the gap and to therefore act to equalise pressure on either side of the seal. Consequently, as the seal transitions across the gap and the sealing between two parts is lost, the fluid pressure imbalance that would otherwise act to deform the seal into the gap has been
(Continued)

reduced. The risk of seal damage during the transition has also therefore been reduced.

4 Claims, 2 Drawing Sheets

(51) Int. Cl.
*F16J 15/16* (2006.01)
*F16L 21/025* (2006.01)
(58) Field of Classification Search
USPC .............................. 285/13, 14, 924; 137/860
See application file for complete search history.

(56) References Cited

U.S. PATENT DOCUMENTS

| | | | | |
|---|---|---|---|---|
| 3,560,017 | A * | 2/1971 | Vogel et al. | B60G 17/052 180/41 |
| 4,039,213 | A * | 8/1977 | Walters | A62C 33/04 285/317 |
| 4,437,647 | A * | 3/1984 | Cruse | F16L 37/23 251/149.9 |
| 4,690,171 | A * | 9/1987 | Johnston | A61B 5/0235 137/625.48 |
| 4,858,648 | A * | 8/1989 | Smith, III | F16L 37/32 137/614.04 |
| 5,135,264 | A * | 8/1992 | Elliott-Moore | F16L 37/144 285/2 |
| 6,027,144 | A * | 2/2000 | Hagen | F16L 37/088 285/93 |
| 6,095,570 | A * | 8/2000 | Hagen | F16L 37/084 285/93 |
| 6,279,451 | B1 * | 8/2001 | Hirano | F15B 15/224 91/405 |
| 6,286,877 | B1 * | 9/2001 | Mendoza | F16J 15/164 285/351 |
| 6,490,961 | B2 * | 12/2002 | Sato | F15B 15/1404 91/406 |
| 6,926,312 | B2 * | 8/2005 | Lacroix | F16L 37/0841 285/317 |
| 7,726,701 | B2 * | 6/2010 | Koji | F16L 19/0286 285/14 |
| 7,744,018 | B2 * | 6/2010 | Alexander | F16L 33/223 239/124 |
| 7,887,102 | B2 * | 2/2011 | Tiberghien | F16L 37/0841 285/1 |
| 7,963,565 | B2 * | 6/2011 | Suter | A61C 19/002 285/13 |
| 2003/0131884 | A1 | 7/2003 | Hope et al. | |
| 2006/0145479 | A1 | 7/2006 | McIntyre | |

OTHER PUBLICATIONS

International Search Report carried out by the European Patent Office for PCT/GB2016/053690 dated Feb. 15, 2017.

* cited by examiner

FLUID COUPLING

FIELD

The present invention relates to an improved fluid coupling and in particular to a fluid coupling having a moving seal which transitions across a gap.

BACKGROUND

Fluid couplings are known wherein a seal transitions across a gap during the coupling or decoupling process. The seal is attached to one part that slides relative to another. The seal provides a sealing point between the two parts and closes a separation distance between the two parts. The gap is an area having a localised increase in the separation distance. In use, fluid is retained on one side of the seal. Fluid pressure exerts a force on the seal. When the seal transitions across relatively small gaps, the fluid pressure is not sufficient to deform the seal into the gap. However, when the gap is relatively large, the fluid pressure can urge the seal to deform into the gap, wherein further movement of the seal risks damaging seal as it becomes sheared between the sliding parts.

Whilst in some case gaps can be engineered to be maintained sufficiently small enough for the seal to transition across without damage, relatively large gaps cannot always be avoided, particularly in instances where the gap is created between two joined parts where the gap between the two parts cannot be easily controlled. A particular example is described in PCT/GB2008/050039. As shown in FIG. 1, here, an annular seal 10 has to transition across a gap 20 created at a join between two parts 30a, 30b. Because the gap 20 between the two joined parts cannot be easily controlled, the gap is often sufficiently large so that as the seal 10 transitions across, fluid 40 retained on the one side of the seal exerts a sufficiently high force against the pressure on the other side of the seal to deform the seal into the gap. As the seal completes the transition across the gap it therefore becomes damaged. In a de-coupling operation, the damage to the seal can prevent re-coupling to the same performance levels. For instance, the recoupled seal may fail at a lower fluid pressure than an undamaged seal.

SUMMARY

It is an object of the present invention to attempt to overcome at least one of the above or other disadvantages. It is an aim of the present invention to provide an improved coupling wherein the risk of damaging a seal transitioning across a relatively large gap is reduced.

According to the present invention there is provided a fluid coupling as set forth in the appended claims. Other features of the invention will be apparent from the dependent claims, and the description which follows.

In the exemplary embodiments a vent is provided between a sealing surface and a gap. An aperture to the vent on the sealing surface is relatively small so that fluid pressure does not act to deform the seal as it cross said aperture. Said aperture is spaced off-set from the gap on the sealing surface. The off-set provides a portion of sealing surface adjacent the gap and between the gap and aperture against which the seal can contact. The vent acts to allow fluid to enter the gap before the seal starts to cross the gap and to therefore act to equalise pressure on either side of the seal. Consequently, as the seal transitions across the gap and the sealing between two parts is lost, the fluid pressure imbalance that would otherwise act to deform the seal into the gap has been reduced. The risk of seal damage during the transition has also therefore been reduced.

BRIEF DESCRIPTION OF DRAWINGS

For a better understanding of the invention, and to show how embodiments of the same may be carried into effect, reference will now be made, by way of example, to the accompanying diagrammatic drawings in which.

DESCRIPTION OF EMBODIMENTS

Figure 1A:
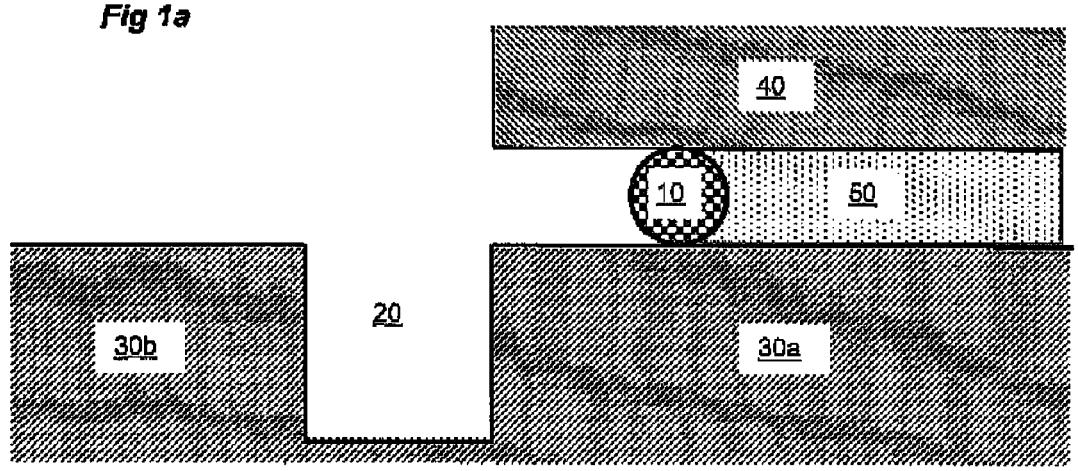
FIG. 1 shows a prior art example of a seal transitioning across a gap.
Figure 1B:
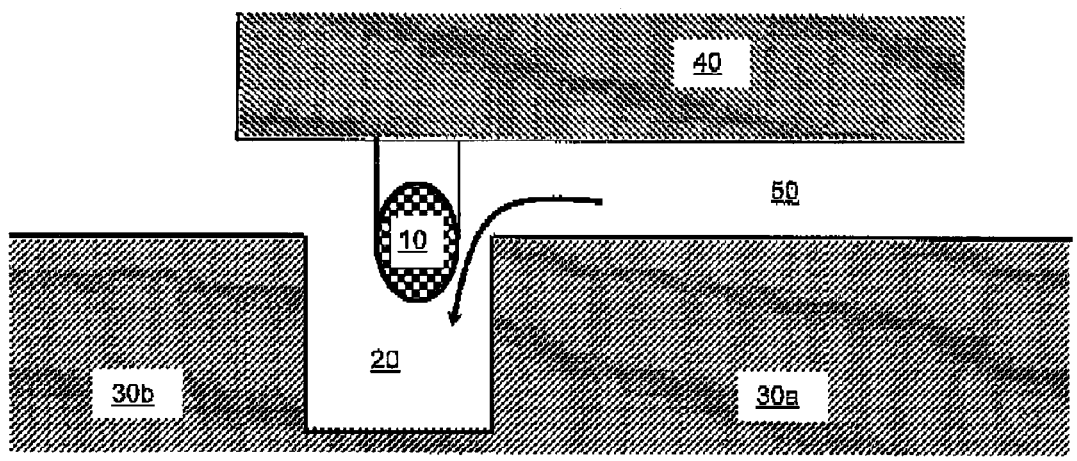
Figure 2A:
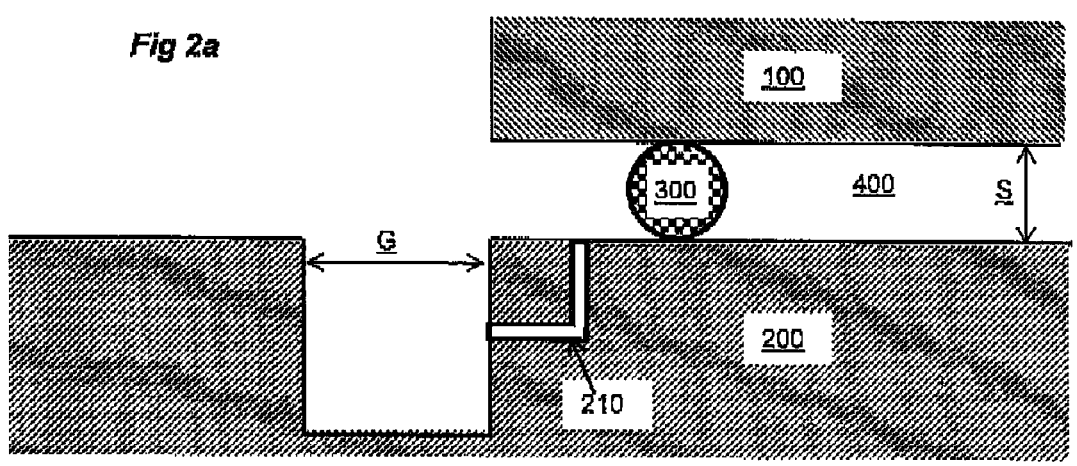
FIG. 2 shows a cross-sectional partial view of a fluid coupling according to an exemplary embodiment showing a seal transitioning across a gap.
Figure 2B:
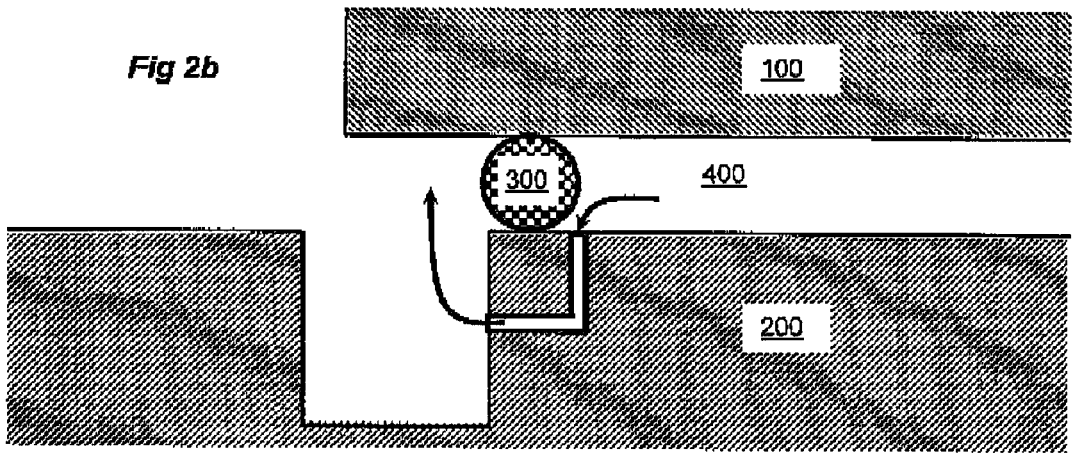
Figure 2C:
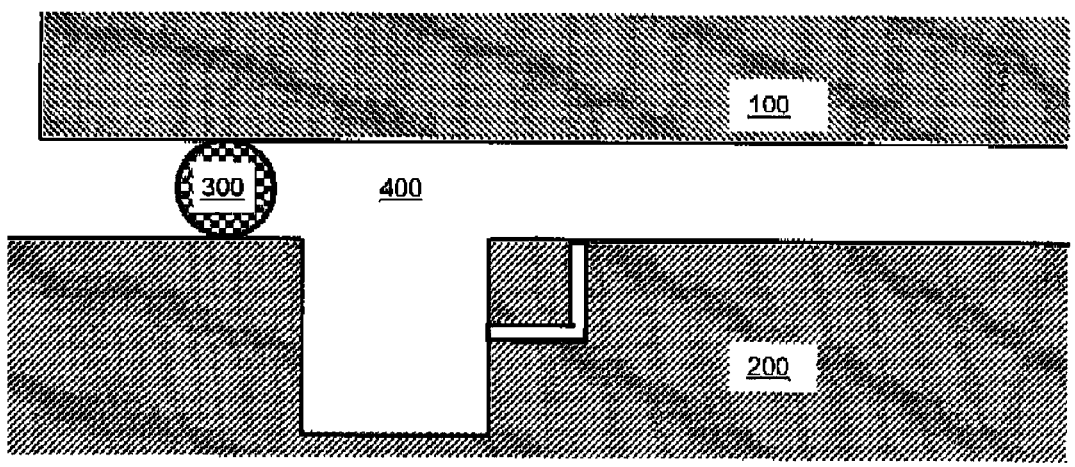

Referring to FIG. 2, a part of a fluid coupling is shown. It will be appreciated by those skilled in the art that the fluid coupling may be any type of fluid coupling wherein a part slides relative to another part and a seal closing a separation (S) between the two sliding parts has to transition across a gap (G). For instance, the seal may be an annular seal such as an o-ring seal wherein the seal is carried on the first part and the gap on the second part. Here, one of the parts may be a probe or piston and the other a socket. A description of the wider coupling is not necessary and is therefore omitted here.

In figure two, the two parts that slide relative to each other are labelled a first part 100 and a second part 200. The first part 100 carries the seal 300. In a first arrangement (FIG. 2A), the seal 300 seals the separation between the two parts. As will be widely understood, fluid 400 on one side of the seal is prevented from escaping to the other side by the seal. The fluid pressure can be high and cause a pressure imbalance between the two sides of the seal.

The second part includes a gap. The gap is an area having a localised increase in the separation distance between the two parts. For instance the gap may be a channel or groove in the second part, or the second part may be an assembly of two separate components that are joined together. The second part also includes a vent 210. The vent is a passageway that extends between an aperture open to the gap and an aperture on a sealing face of the second part spaced from the gap. The aperture on the sealing face is spaced approximately the same distance as a thickness of the seal. That is, the spacing is such that there is sufficient sealing surface between the edge of the gap and the aperture for the seal to locate. The aperture on the sealing surface can be machined or formed into the coupling in a precise and controlled manner and is arranged to be sufficiently small that the fluid pressure does not force the seal to deform into the aperture.

In the exemplary embodiments, the vent is shown as an aperture having an elbow. Suitably formed by drilling two blind bores to meet. However, other fluid passageway design are envisaged, that create the vent between the two surfaces.

During operation of the coupling, the seal 300 is caused to transition from one side of the gap to the other. Once a sealing point of the seal moves past the aperture to the vent on the sealing surface, fluid is able to enter the vent. At this point in the transition, the seal has not started to cross the gap to allow the fluid to enter the gap between the seal and sealing surface. However, fluid can now enter the gap through the vent. Consequently, the fluid pressure on either side of the seal is equalised, or at least partially equalised. As such, when the seal reaches the gap, the fluid pressure acting on the seal and which would otherwise force the seal to deform into the gap is reduced due to the equalising or part equalising of the pressures on either side of the seal. The seal can therefore transition across the gap with no or substantially reduced deformation into the gap. Therefore the risk of causing damage to the seal during the transition is reduced or removed.

Although a few preferred embodiments have been shown and described, it will be appreciated by those skilled in the art that various changes and modifications might be made without departing from the scope of the invention, as defined in the appended claims.

The invention claimed is:

1. A fluid coupling having a first part sealed to a sealing surface of a second part, wherein;
    the first part carries a sealing part;
    the second part includes a gap in the sealing surface, across which the sealing part is arranged to transition; characterised in that wherein:
        the second part includes a vent between the sealing surface and the gap, the gap forming a fluid passageway between an opening on the sealing surface and an opening to the gap, the opening on the sealing surface being offset from the gap and arranged to allow fluid to enter the gap before the sealing part reaches the gap and the seal between the sealing surface and first part is broken.

2. The fluid coupling of claim 1, wherein the second part is formed from a first section and a second, separate section, the gap being formed by a junction between the first and second sections.

3. The fluid coupling of claim 1, wherein the first section includes a first vent for venting said seal as said seal moves in one direction, and the second section includes a second vent for venting said seal as said seal moves in a second direction.

4. The fluid coupling of claim 1, wherein the vent comprises a bent fluid passageway between the respective apertures opening on the sealing surface and the opening to the gap.

* * * * *